United States Patent
Alber

(10) Patent No.: US 11,590,653 B2
(45) Date of Patent: Feb. 28, 2023

(54) METHOD FOR ORIENTING TWO WORKPIECES TO FORM A JOINING CONNECTION AND MANIPULATOR

(71) Applicant: BAOSTEEL LASERTECHNIK GMBH, Ravensburg (DE)

(72) Inventor: Gerhard Alber, Berg (DE)

(73) Assignee: Baosteel Lasertechnik GmbH, Ravensburg (DE)

(*) Notice: Subject to any disclaimer, the term of this patent is extended or adjusted under 35 U.S.C. 154(b) by 526 days.

(21) Appl. No.: 16/693,803

(22) Filed: Nov. 25, 2019

(65) Prior Publication Data

US 2020/0156250 A1    May 21, 2020

Related U.S. Application Data

(63) Continuation of application No. PCT/EP2018/063954, filed on May 28, 2018.

(30) Foreign Application Priority Data

May 30, 2017 (DE) ..................... 10 2017 111 800.4

(51) Int. Cl.
*B25J 9/16* (2006.01)
*B25J 13/08* (2006.01)
(Continued)

(52) U.S. Cl.
CPC ........... *B25J 9/1687* (2013.01); *B25J 13/089* (2013.01); *B25J 15/0052* (2013.01);
(Continued)

(58) Field of Classification Search
CPC ...... B23K 15/0046; B23P 21/00; B25J 15/06; B25J 19/02; B25J 9/026; B25J 15/0052; B25J 13/089; B25J 9/1687
See application file for complete search history.

(56) References Cited

U.S. PATENT DOCUMENTS

2010/0232923 A1* 9/2010 Dorner .................... B23Q 7/18
                                                    414/816
2016/0325438 A1* 11/2016 Li ......................... B25J 15/0052
(Continued)

FOREIGN PATENT DOCUMENTS

DE    10 2004 049 332 A1    4/2006
DE    10 2004 051 977 A1    4/2006
(Continued)

OTHER PUBLICATIONS

German Office Action (Application No. 10 2017 111 800.4) dated Jan. 20, 2022.
(Continued)

*Primary Examiner* — Jermie E Cozart
(74) *Attorney, Agent, or Firm* — Burr Patent Law, PLLC

(57) ABSTRACT

The invention relates to a method for orientating two workpieces in order to form a joining connection, wherein in a longitudinal orientation step the first workpiece is orientated relative to the second workpiece) along at least one of the workpiece edges by linear movement of at least one of the grippers relative to the other gripper and wherein the longitudinal orientation step is carried out during the transport of the workpieces from the provision station to the processing station. Furthermore, the invention relates to a manipulator which comprises a first gripper and a second gripper.

23 Claims, 10 Drawing Sheets

(51) Int. Cl.
*B25J 15/00* (2006.01)
*B23P 21/00* (2006.01)
*B25J 19/02* (2006.01)
*B25J 9/02* (2006.01)
*B25J 15/06* (2006.01)
*B23K 15/00* (2006.01)

(52) U.S. Cl.
CPC ........... *B23K 15/0046* (2013.01); *B23P 21/00* (2013.01); *B25J 9/023* (2013.01); *B25J 9/026* (2013.01); *B25J 15/06* (2013.01); *B25J 19/02* (2013.01)

(56) References Cited

U.S. PATENT DOCUMENTS

| | | |
|---|---|---|
| 2017/0052534 A1 | 2/2017 | Ghanem |
| 2018/0002118 A1 | 1/2018 | Semmelrock et al. |

FOREIGN PATENT DOCUMENTS

| | | |
|---|---|---|
| DE | 10 2013 014 287 A1 | 3/2014 |
| WO | 2009/112051 A1 | 9/2009 |
| WO | 2009/140977 A1 | 11/2009 |
| WO | 2012/163390 A1 | 12/2012 |
| WO | 2016/116361 A1 | 7/2016 |

OTHER PUBLICATIONS

English translation of International Preliminary Report on Patentability (Chapter I) (Application No. PCT/EP2018/063954) dated Dec. 3, 2019, 6 pages.

\* cited by examiner

METHOD FOR ORIENTING TWO WORKPIECES TO FORM A JOINING CONNECTION AND MANIPULATOR

CROSS REFERENCE TO RELATED APPLICATIONS

This application is a continuation of International Application No. PCT/EP2018/063954 filed May 28, 2018, which designated the United States, and claims the benefit under 35 USC § 119(a)-(d) of German Application No. 10 2017 111 800.4 filed May 30, 2017, the entireties of which are incorporated herein by reference.

FIELD OF THE INVENTION

The present invention relates to a method for orientating two workpieces in order to form a joining connection and a manipulator for carrying out such a method.

BACKGROUND OF THE INVENTION

In order to produce so-called tailored blanks, workpieces typically constructed as sheet metal plates of different materials or material qualities and/or sheet thicknesses are combined and connected by welding in order to then subsequently be shaped, for example, by deep-drawing. The Leading Edge Offset (LEO) and the Trailing Edge Offset (TEO), that is to say, the offset which the workpieces which are intended to be connected have after welding at the leading edge or the trailing edge, are subjected by the automotive industry to very high demands which can only be complied with when both workpieces are oriented very precisely with respect to each other prior to the welding.

From the prior art, methods for orientating two workpieces in order to form a joining connection which comprise the steps mentioned below are known: inserting or holding at least two workpieces in a provision station, gripping the first workpiece with a first gripper, gripping the second workpiece with a second gripper and removing the workpieces from the provision station and transporting the workpieces to a processing station. Using such methods, the requirements of the automotive industry with regard to a minimum offset between the workpieces cannot be complied with.

Furthermore, manipulators which comprise a first gripper and a second gripper are known from the prior art.

SUMMARY OF THE INVENTION

An object of the present invention is to provide a method and a device which enable a very precise orientation of the workpieces without an orientation station having to be arranged between a provision station and a processing station which are each linked for the material flow by a manipulator.

The method according to the present invention for orientating two workpieces in order to form a joining connection which are constructed, in particular, as planar workpieces in the form of plates comprises the steps that in a longitudinal orientation step the first workpiece is orientated relative to the second workpiece along at least one of the workpiece edges by linear movement of at least one of the grippers relative to the other gripper and that the longitudinal orientation step is carried out during the transport of the workpieces from the provision station to the processing station. The objective of an orientation station for orientating the workpieces using the grippers which are provided in any case is hereby implemented so that additional handling of the workpieces in an orientation station and an additional transport step can be prevented. This affords not only the advantage of saving cycle time, but also means lower costs for the production installation since neither the orientation station mentioned nor an additional transport system between the orientation station and the processing station are required.

There is further provision for the method to be configured in such a manner that prior to the longitudinal orientation step in a transverse orientation step a first movement of the first gripper is carried out in the direction of the second gripper, and/or a first movement of the second gripper is carried out in the direction of the first gripper, wherein there is, in particular, provision during the movement of the two grippers for the first and second movement to be carried out simultaneously or successively, and wherein there is, in particular, provision for the transverse orientation step to be carried out during the transport of the workpieces from the provision station to the processing station. It is thereby ensured that the two workpieces are orientated prior to the longitudinal orientation step with respect to the longitudinal edges thereof which are intended to be joined parallel in the x direction (direction of the weld seam which is intended to be formed) so that prior to the welding a pushing-together movement which can be implemented in a technically simple and rapid manner still has to be carried out at most.

There is further provision for the method to be configured in such a manner that in the transverse orientation step the first workpiece is approached with the first movement, in particular, with the longitudinal edge thereof which is intended to be joined against a first stop (transverse stop) and touches this stop as a first reference position and the second workpiece is approached with the first movement, in particular, with the longitudinal edge thereof which is intended to be joined against a second stop (transverse stop) and touches this stop as a first reference position. A parallel orientation of the workpieces with respect to mutually opposing longitudinal edges is thereby achieved in a simple manner. There is provision for the approach of both workpieces to be carried out in such a manner that during the approach they can also rotate or pivot in a displacement plane in which they are moved if such a rotation or pivoting is required in order to achieve a linear abutment against the first or second stop. In this instance, according to a first construction variant, there is provision for such a rotation or pivoting to be carried out by a motorized drive. The motorized drive is then constructed in such a manner that the gripper is rotated or pivoted about the vertical axis thereof selectively to the left or the right. According to a second construction variant, there is provision for the plate with the gripper to be able to be rotated or pivoted by external forces acting on the plate. To this end, the gripper can be freely rotated about the vertical axis thereof. A brake or blocking device which may be present is released during the process of orientation of the plate on a transverse stop so that the gripper is rotated or pivoted with the plate to the left or right.

There is also provision for the method to be configured in such a manner that after the transverse orientation step in the longitudinal orientation step a second movement of the first gripper in a direction which differs from the first movement and which is non-parallel with the first movement of the first gripper is carried out and/or a second movement of the second gripper in a direction which differs from the first movement and which is non-parallel with the first movement of the second gripper is carried out, wherein there is, in particular, provision in the event of movement of both grippers for the second movements to be carried out simultaneously. As a result of the longitudinal orientation step being carried out after the transverse orientation step, it is easy to ensure that a correct transverse orientation when the longitudinal orientation step is carried out is not lost. As a result of simultaneous movement, the overall time of the movement is kept short.

There is further provision for the method to be configured in such a manner that in the longitudinal orientation step during the second movement of the first workpiece the first workpiece is approached against a third stop which is constructed as a longitudinal stop and, in particular, uses this stop as a reference position, and during the second movement of the second workpiece the second workpiece is approached against a fourth stop which is constructed as a longitudinal stop and, in particular, uses this stop as a reference position. The longitudinal orientation of the two workpieces is thereby brought about by a single displacement movement of the gripper and consequently takes little time. In this instance, the third and the fourth stops are each constructed as a physical stop for mechanical contact or as a virtual stop in a contact-free manner, by which the movement of the workpiece is stopped in a precise manner.

There is also provision for the method to be configured in such a manner that, at the beginning of the longitudinal orientation step prior to the second movement of the first workpiece and/or prior to the second movement of the second workpiece, at least one measurement operation is included, wherein in the measurement operation a first reference position on the first workpiece and a second reference position on the second workpiece is detected by at least one sensor, preferably one sensor each and a relative spacing in at least one spatial direction between the first and the second reference position is established and stored. The sensors can thereby be arranged independently of the actual position which the two workpieces are intended to occupy.

There is further provision in the method for ending the longitudinal orientation step for at least one movement of one of the grippers for orientating one of the workpieces with respect to a contactless reference mechanism, in particular, a position sensor or, in particular, a virtual stop, to be carried out. In this manner, the final longitudinal orientation can be carried out by a gentle and consequently precise displacement movement of the gripper or the grippers.

There is further provision for the first gripper and the second gripper to be arranged on a common manipulator, preferably on a common multi-axis robot, and to be moved in space by this manipulator together from the provision station to the processing station. Only one manipulator is thereby sufficient for the transport of two workpieces. Furthermore, as a result of the common connection of the two grippers to the same manipulator, a mechanical coupling of the grippers is achieved and consequently a precise transverse and longitudinal orientation of the workpieces is facilitated.

There is further provision after the longitudinal orientation step for an offset position of the workpieces as a whole to be measured and for the grippers to be displaced during the transfer around the offset position, wherein the displacement is superimposed on a transport movement or is carried out in a transport pause (floating at rest). It is thereby possible for workpieces of extremely different dimensions to be handled and orientated without adaptations having to be carried out on the grippers or on the manipulator.

There is also provision for the manipulator during the deposit in the processing station to correct an offset, preferably in the longitudinal direction. The workpiece pairs thereby do not have to be located precisely in the gripper but instead only precisely relative to each other.

There is further provision in the method for the workpieces after the longitudinal orientation step in the processing station to be joined to each other and, in particular, welded to each other, wherein the welding is carried out, in particular, by a laser welding method. With these steps, an economic production of tailor-made components from workpieces which are orientated with respect to each other in a highly precise manner is possible.

Finally, there is provision for the workpieces to be constructed as planar plates, in particular, sheet metal plates and preferably sheet metal plates of different thicknesses and/or different materials. Such workpieces are particularly suitable for the method.

In the manipulator according to the present invention, which comprises a first gripper and a second gripper, there is provision for the manipulator to comprise a mechanical stop mechanism, in particular, a roller block, wherein the mechanical stop mechanism, in particular, the roller block, is arranged between the grippers, wherein the mechanical stop mechanism define a stop edge in the direction toward the first gripper, wherein there is, in particular, provision for the roller block to comprise in the direction toward the first gripper at least three rollers which define the stop edge with the running faces thereof, wherein the mechanical stop mechanism define a stop edge in the direction toward the second gripper, wherein there is, in particular, provision for the roller block to comprise in the direction toward the second gripper at least three additional rollers which define the stop edge with the running faces thereof, wherein the defined stop edges are orientated parallel with each other, wherein the grippers can each be displaced parallel with the stop edges longitudinally in the direction of an x-axis, wherein the grippers can each be displaced transversely relative to the stop edges transversely in the direction of a y-axis, and wherein the grippers can be rotated about a vertical axis which is perpendicular to the x direction and the y direction. Using such a manipulator, workpieces can be orientated with respect to each other during the transport.

There is also provision with the manipulator for the grippers to be driven pneumatically in the direction of the transversely extending y axis and/or for at least one of the grippers to be driven in the direction of the longitudinally extending x axis by a servo motor or step motor. As a result of the use of drives which are adapted to the different requirements, the manipulator can be produced in a cost-effective manner.

There is further provision on the manipulator for at least one sensor, in particular, a measuring sensor, to be associated with each gripper, wherein the sensor is constructed, in particular, as a surface sensor which monitors a surface and/or for at least one of the sensors to be fixed to the manipulator and to be able to be displaced with the manipulator and/or for at least one of the sensors to be a non-displaceable component of the production installation and/or for the mechanical stop mechanisms which are, in particular, constructed as a roller block to be divided in two at each stop edge in the longitudinal direction into a first portion and a second portion and for the first portion and the second portion each to be galvanically separated from each other so that an electrically conductive workpiece which abuts both block portions can be electrically detected. Such a manipulator enables both an orientation of workpieces and monitoring or control of the orientation steps which have been carried out.

Finally, there is provision for the manipulator to comprise a portal carrier, wherein the portal carrier is flange-mounted on the manipulator and wherein the portal carrier is arranged between the manipulator and the two grippers, wherein the roller block is also flange-mounted on the manipulator in such a manner that the manipulator moves the grippers and the roller block together and in such a manner that the first gripper moves the first workpiece and the second gripper moves the second workpiece independently of each other relative to the portal carrier and relative to the roller block which is fixed to the portal carrier. As a result of the fact that the two workpieces are carried and moved by the grippers which are arranged on the same manipulator the orientation of the two workpieces can be carried out using technically simple means.

In the context of the present invention, grippers are intended to be understood to be suction grippers or magnetic grippers or combinations of suction and magnetic grippers.

In the context of the present invention, reference positions may be edges of the workpieces but also defined holes in the workpieces or markings, such as, for example, color markings or position cams on the workpieces. Such positions may also be detected by sensors and provide the required measurement values of the given offset in order to orientate the workpieces relative to each other.

In the context of the present invention, the time period referred to as "during the transport" is intended to be understood to be the time period between the removal of the workpieces from the provision station and the depositing of the workpieces in the processing station. In this instance, there is no provision for the workpieces to be moving permanently, but a depositing of the workpieces in a station during the transport is not possible. The workpieces always remain during the transport arranged on the manipulator.

A "virtual stop" in the context of the present invention is also intended to be understood to be inter alia a predetermined position of a servo motor/step motor which is, for example, predetermined by a measured distance value (offset).

In the context of the present invention, a simultaneous implementation of a transverse orientation step and/or a longitudinal orientation step is intended to be understood to mean that both grippers are displaced in at least one period of time.

BRIEF DESCRIPTION OF THE DRAWINGS

Further details of the present invention will be described in the drawings with reference to an embodiment which is schematically illustrated.

DETAILED DESCRIPTION OF THE INVENTION

Figure 1:
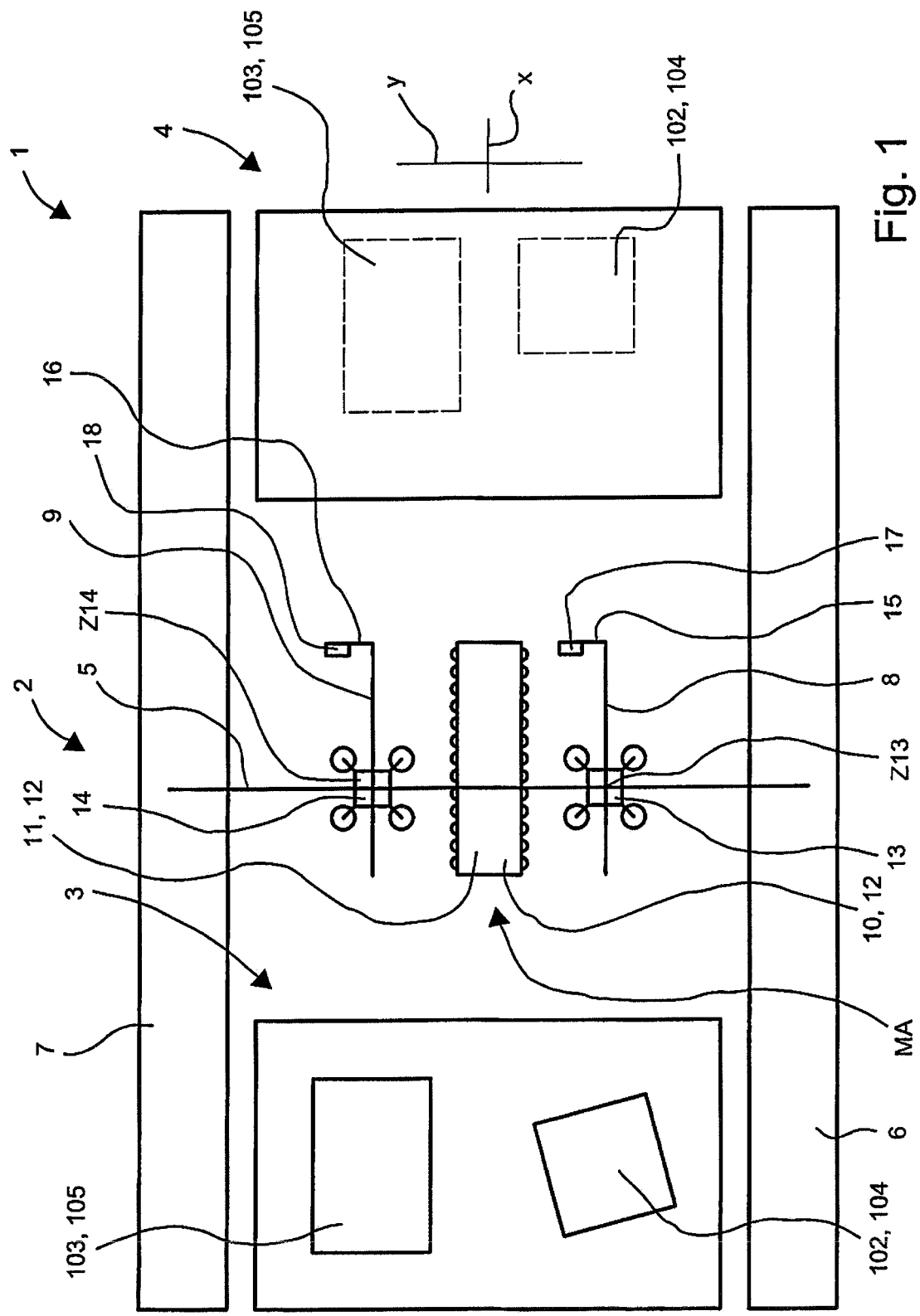
FIG. 1 is a schematic view of a portion of a first construction variant of a production installation for producing tailor-made components from two workpieces, wherein the production installation comprises a manipulator, a provision station and a processing station.
Figure 9:
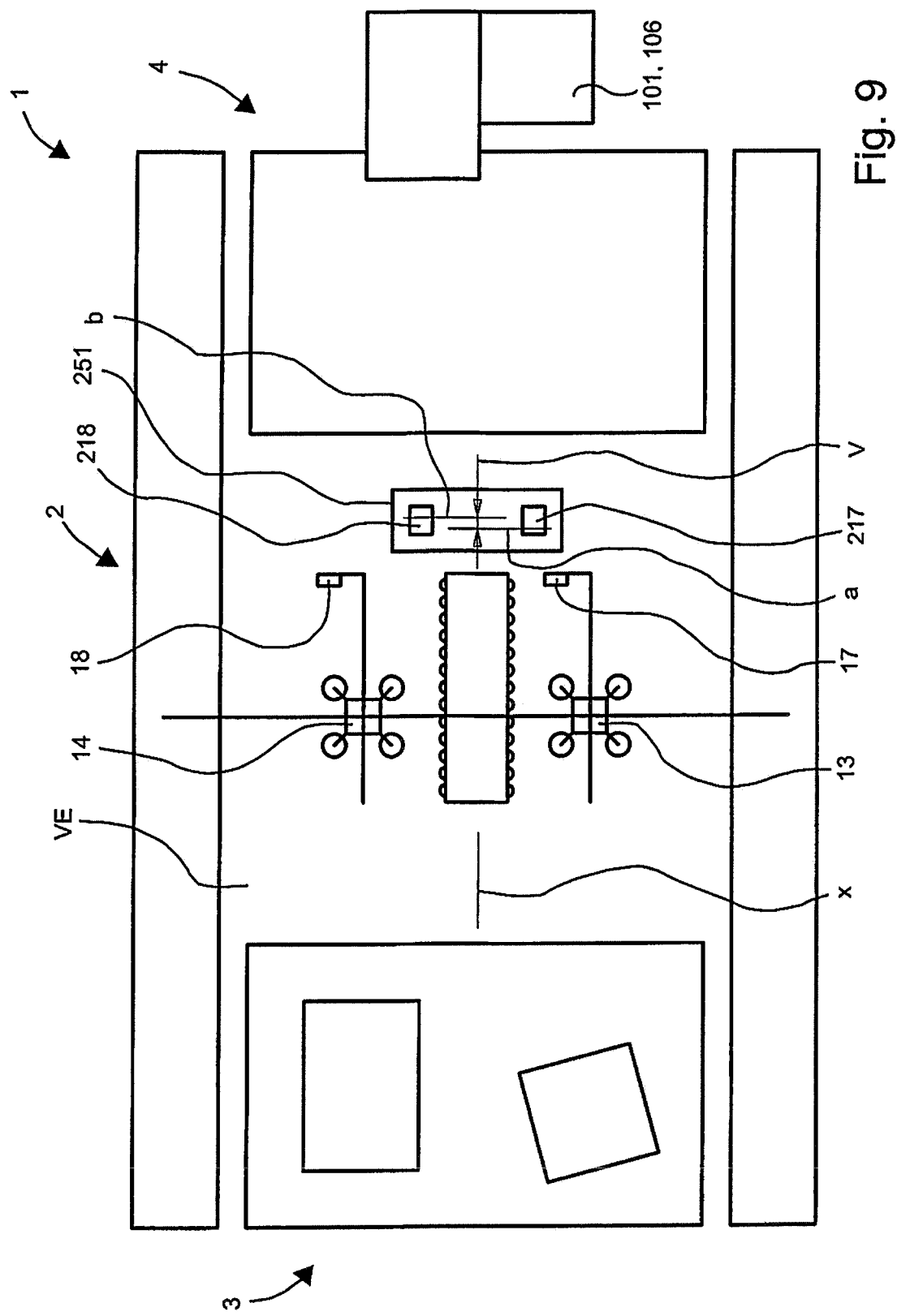

FIG. 1 is a schematic plan view of a portion of a first construction variant of a production installation 1 for producing tailor-made components 101 (see FIG. 9) from planar workpieces 102, 103, wherein the workpieces are constructed as plates 104, 105 and are welded to form a tailor-made metal sheet 106 (see FIG. 9). The production installation 1 comprises a manipulator 2, a provision station 3 and a processing station 4.

The manipulator 2 is used in principle to transport the workpieces 102, 103 from the provision station 3 into the processing station 4, wherein in FIG. 1 in the processing station 4, there is illustrated with broken lines the location where the workpieces 102, 103 are deposited by the manipulator 2 in the processing station 4.

The manipulator 2 comprises a portal carrier 5 which can be displaced on rails 6, 7 along an x axis. The manipulator 2 comprises mechanical stop mechanisms MA which are arranged on the portal carrier 5 between two longitudinal cross-members 8, 9. The mechanical stop mechanisms MA comprise a first stop 10 and a second stop 11, wherein the stops 10, 11 are constructed as transverse stops 12. The longitudinal cross-members 8, 9 can be displaced along a y axis on the portal carrier 5 and carry grippers 13, 14 which can be displaced along the x axis on the longitudinal cross-members 8, 9 and which can each be rotated or pivoted about z axes Z13 or Z14 or vertical axes which are orientated perpendicularly to the drawing plane and orthogonally relative to the x axis and the y axis with respect to the associated longitudinal cross-member 8, 9 in each case and can preferably be lowered and raised in the direction of the associated z axes Z13 or Z14. On the longitudinal cross-members 8, 9 in each case in the direction toward the processing station 4 a sensor 17, 18 is suspended on a retention arm 15, 16. According to a construction variant which is not illustrated, there is provision for the sensor(s) mentioned not to be arranged on the manipulator, but instead to be arranged in a state fixed in the production installation so that the manipulator moves the first plate and/or the second plate during the transport from the provision station to the processing station through a monitoring region of the at least one sensor. Such a construction variant is illustrated schematically in FIG. 9 as an alternative.

Figure 2:
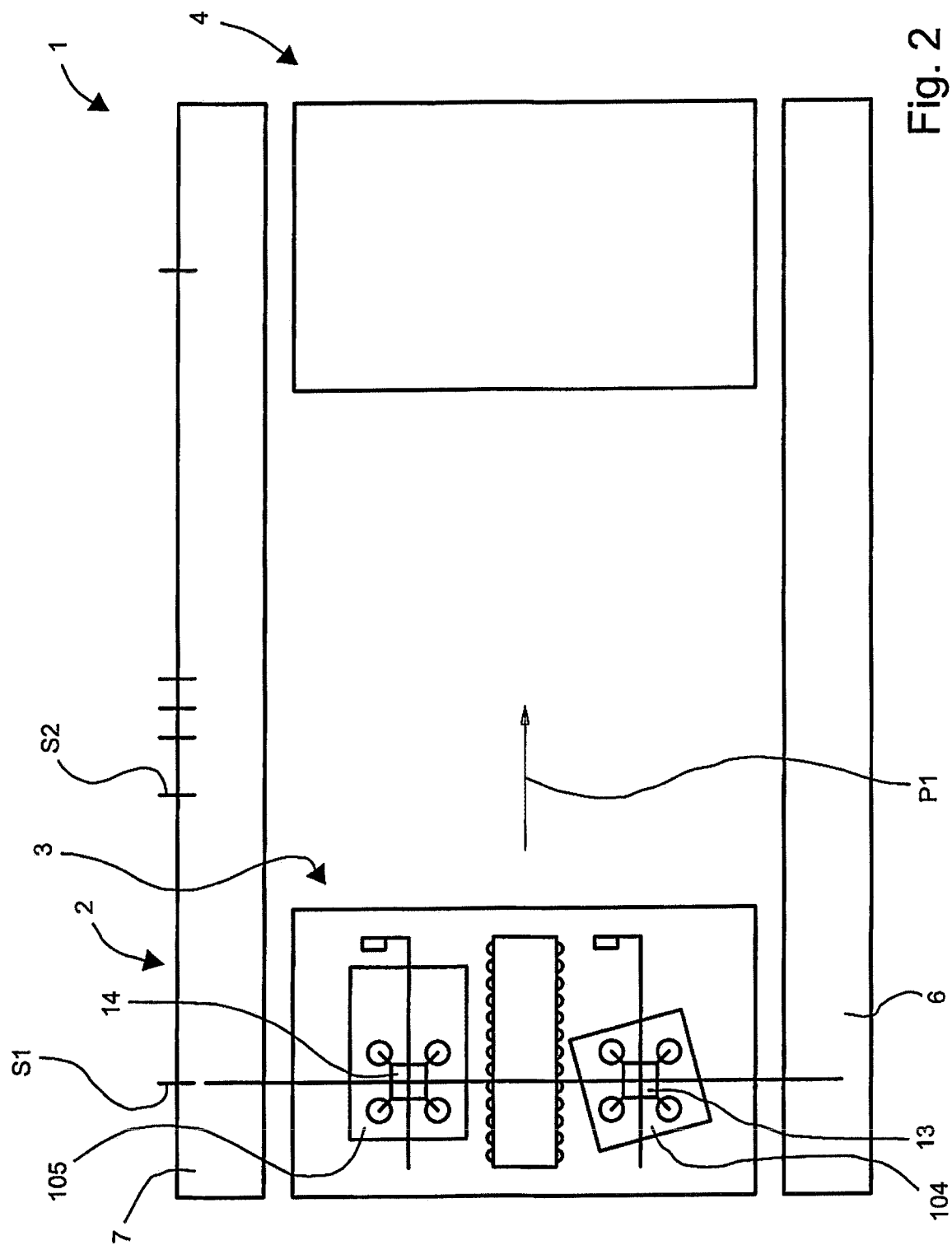
FIGS. 2 to 9 show eight snapshots from the method sequence in each case as a plan view of the first construction variant of the production installation illustrated as a cut-out in FIG. 1.

FIG. 2 shows in a first snapshot how the manipulator 2 is moved on the rails 6, 7 over the provision station 3 and with the gripper 13 thereof has drawn and raised the plate 104 and with the gripper 14 thereof has drawn and raised the plate 105 so that they can be transported and moved with the gripper 13 or 14. With an arrow P1, it is indicated that the manipulator 2 now moves together with the gripped plates 13, 14 from the position S1 thereof into a position S2 in which it is then shown in FIG. 3. According to a construction variant which is not illustrated, there is also provision for the grippers to comprise electromagnets instead of pneumatic suckers in order to grip the plates. In another construction variant, there is provision for the grippers to comprise pneumatic suckers and electromagnets.

Figure 3:
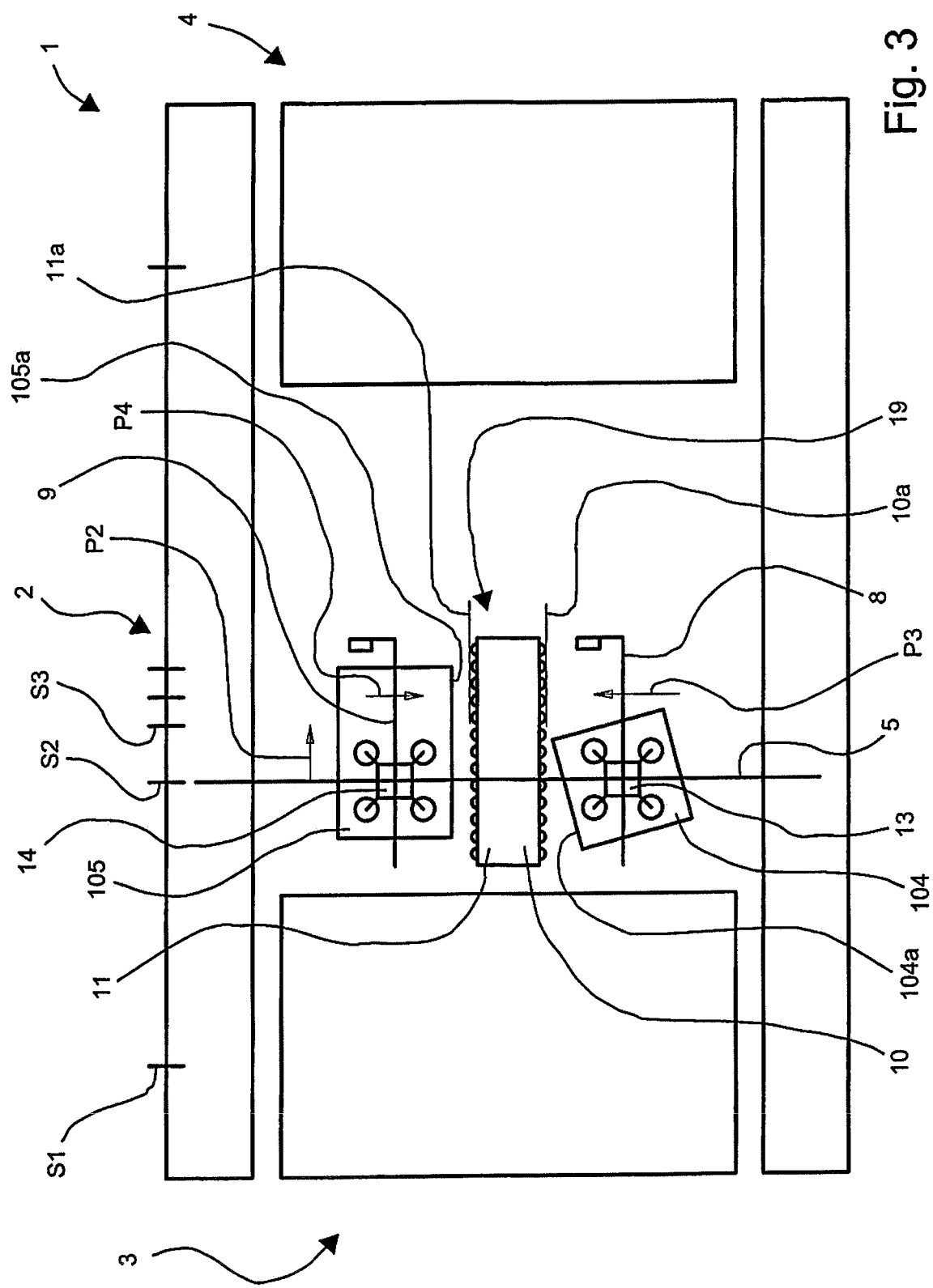

FIG. 3 shows in a second snapshot how the manipulator 2 has reached the mentioned position S2, wherein the plates 13, 14 on the way from the position S1 into the position S2 have not yet been moved relative to the portal carrier 5 of the manipulator 2. With an arrow P2, it is indicated that the manipulator 2 now moves further into a position S3 and in this instance in accordance with arrows P3 and P4 the grippers 13, 14 are also moved together with the longitudinal carriers 8, 9 and the plates 104, 105 which are bonded to the grippers 13, 14 in the direction of the first stop 10 and in the direction of the second stop 11 in order to carry out a transverse orientation step during the displacement movement of the manipulator 2 along the X axis in the direction of the processing station 4.

Figure 4:
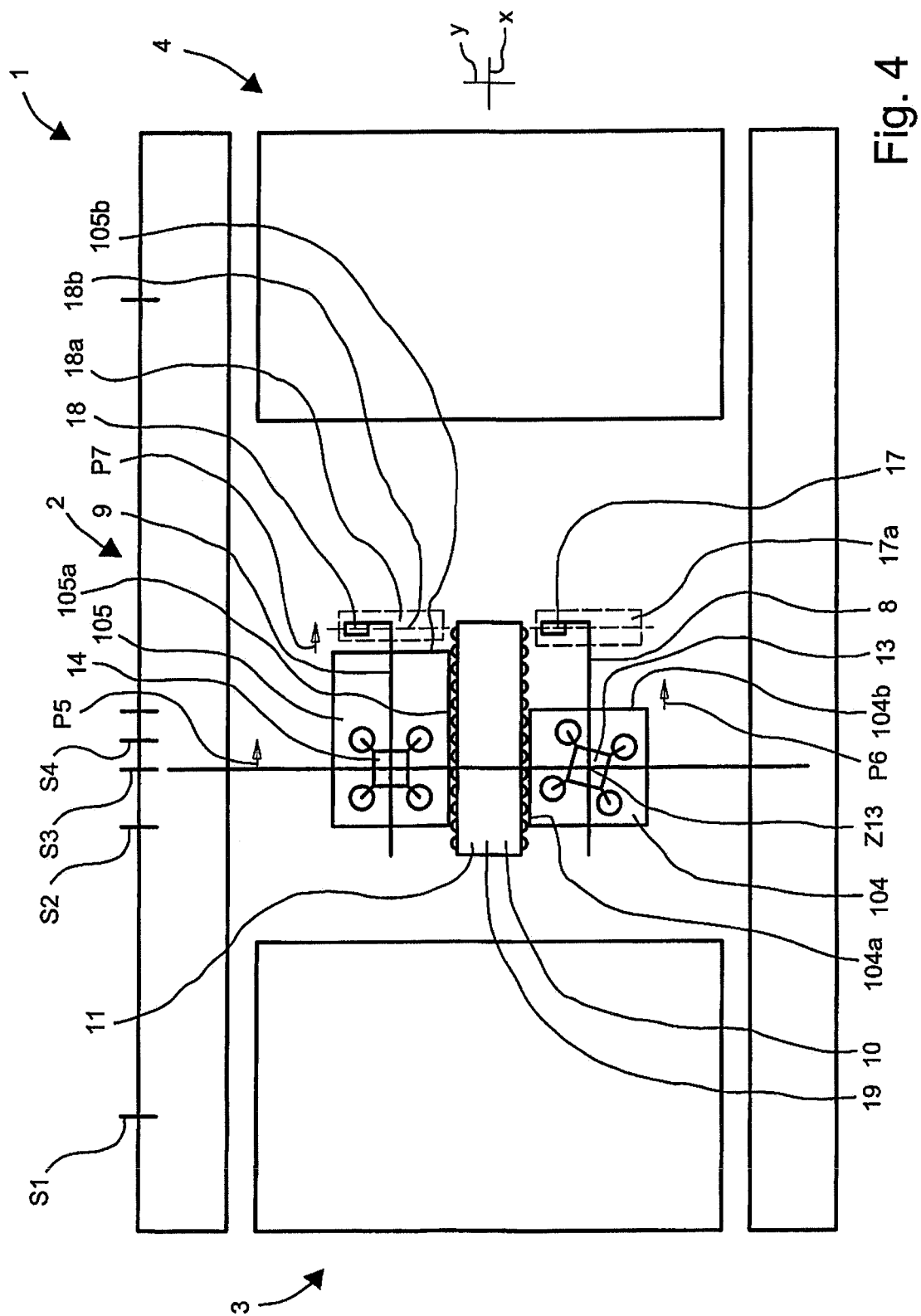

FIG. 4 shows in a third snapshot how the transverse orientation step which is carried out between the positions S2 and S3 has already been completed. This is shown in that the plate 104 is in abutment by a longitudinal edge 104a or workpiece edge (see also FIG. 3) which is intended to be joined with the first stop 10 of the manipulator 2 and the plate 105 is in abutment by a longitudinal edge 105a or workpiece edge (see FIG. 3) which is intended to be joined with the second stop 11 of the manipulator 2. In this instance, the second plate 105 was approached only linearly in the direction of the y axis toward the second stop 11. In the case of the first plate 104, during the approach toward the first stop 10 there was also carried out a rotation of the plate 104 in a clockwise direction through approximately 15° since the first plate 104 in the provision station 3 was orientated obliquely with the longitudinal edge 104a thereof which is intended to be joined with respect to the first stop 10. Accordingly, the first gripper 13 in the transverse orientation step described in the context of a forced movement when the first plate 104 floats toward the first stop was rotated about the z axis Z13 thereof through 15° in a clockwise direction. This rotation may alternatively also be carried out as an active movement by a rotary drive. As indicated with arrows P5, P6, P7 in FIG. 4, the manipulator 2 moves with the plates 104, 105 further into a position S4, wherein during this movement the plates 104, 105 of the grippers 13, 14 are also displaced in the direction of the x axis along the stops 10, 11 on the longitudinal cross-members 8, 9 in the direction of the processing station 4. Accordingly, the plates 104, 105 are now moved by the grippers 13, 14 with the guiding edges 104b or 105b thereof toward the sensors 17, 18 which are directed downward (into the drawing plane) and into the monitoring regions 17a and 18a thereof.

Figure 5:
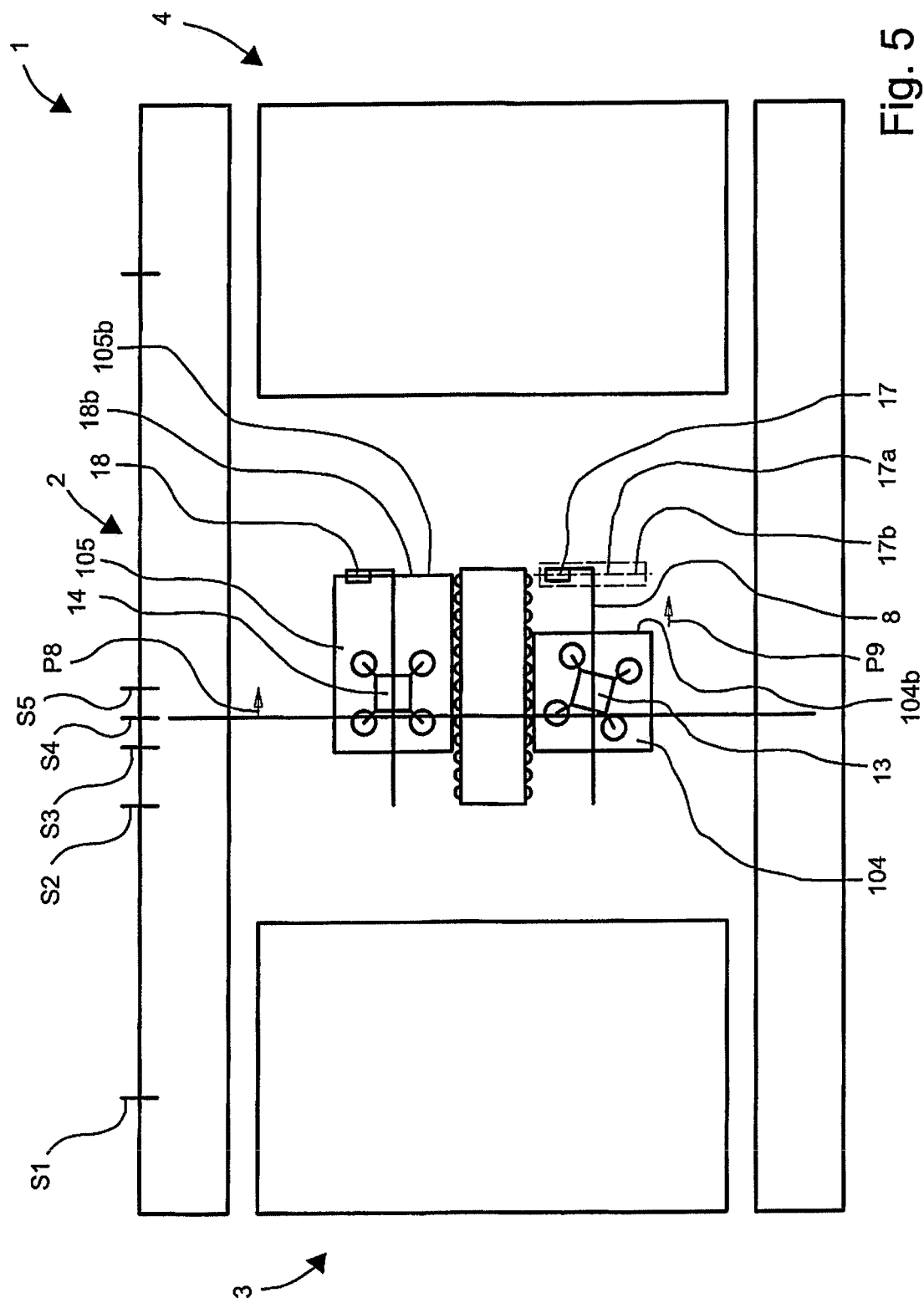

FIG. 5 shows in a fourth snapshot how the movement of the gripper 14 is stopped by the sensor 18 when the second plate 105 has reached with the guiding edge 105b thereof a defined position 18b in the monitoring region 18a (see also FIG. 5). The defined position 18b forms a fourth stop, which is constructed as a virtual stop or virtual longitudinal stop. Using arrows P8 and P9, it is indicated that on the path of the manipulator 2 from the position S4 into the position S5, the gripper 13 is displaced further on the longitudinal cross-member 8 in order to move the guiding edge 104b of the first plate 104 into a monitoring region 17a of the sensor 17.

Figure 6:
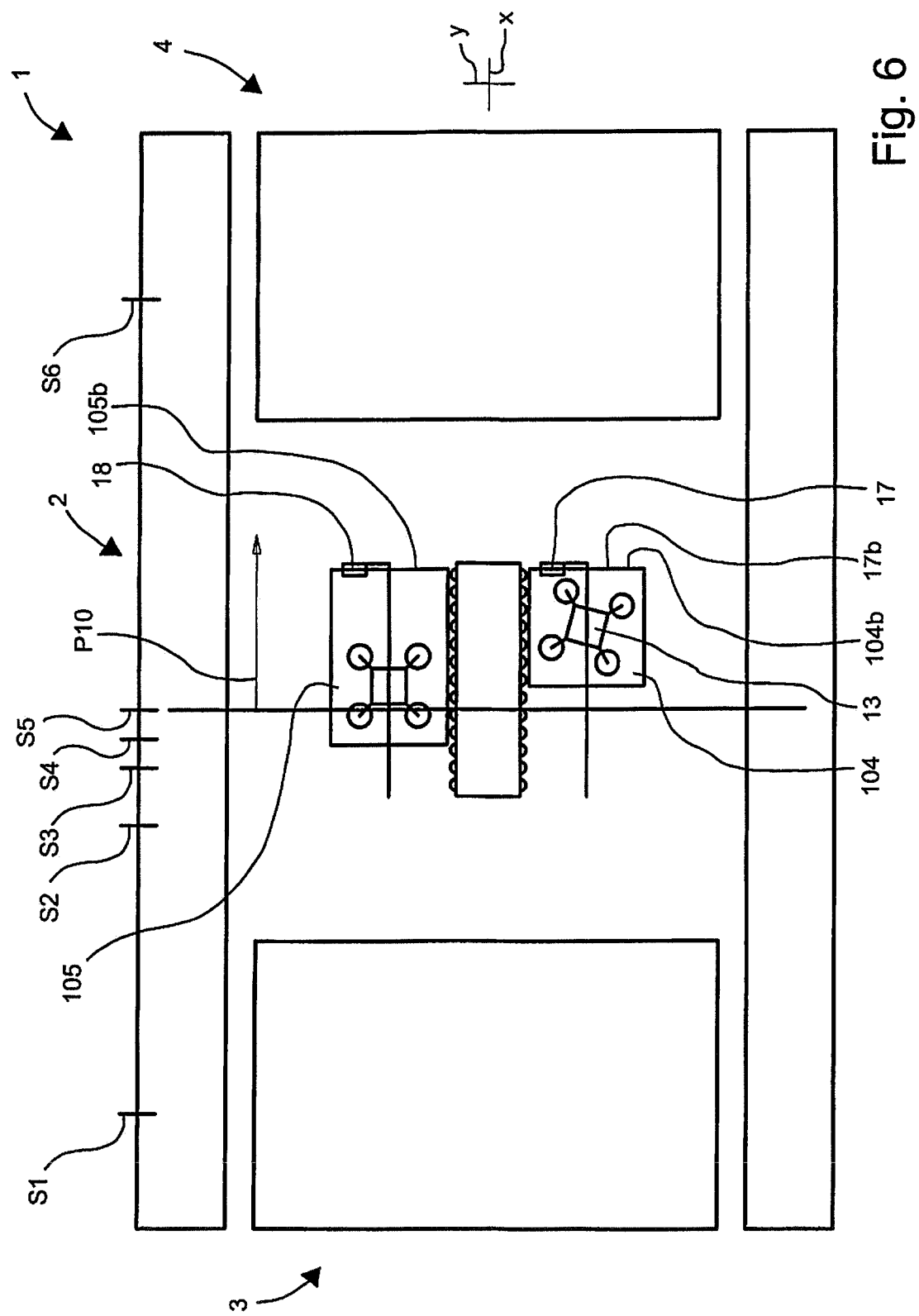

In FIG. 6, a fifth snapshot now shows how the movement of the gripper 13 is stopped by the sensor 17 when the first plate 104 in the monitoring region 17a (see FIG. 5) has reached a defined position 17b with the guiding edge 104b thereof (see FIG. 5). The defined position 17b forms a third stop which is constructed as a virtual stop or virtual longitudinal stop.

If the sensors 17, 18 are positioned precisely with respect to each other such that the guiding edges 104b and 105b of the plates 104, 105 now merge smoothly into each other when the plates 104, 105 are pushed together transversely relative to the x axis along the y axis, then the manipulator 2, as indicated by the arrow P10 can move with the plates 104, 105 from the position S5 further into a position S6.

If there is still an offset between the plates or an offset is intended to be corrected, the plates can be displaced independently of each other and relative to each other by the grippers along the x axis so that the desired orientation of the plates is achieved. Where applicable, it is also sufficient for only one plate to be displaced. Furthermore, there is optionally provision for the method to be carried out in a state monitored by sensors or for a drive of the first gripper and/or a drive of the second gripper to be accordingly controlled in order to move the plate into a desired position. All the displacement movements mentioned can be carried out both whilst the portal carrier of the manipulator is moving and whilst the portal carrier of the manipulator is in an idle state.

Figure 7:
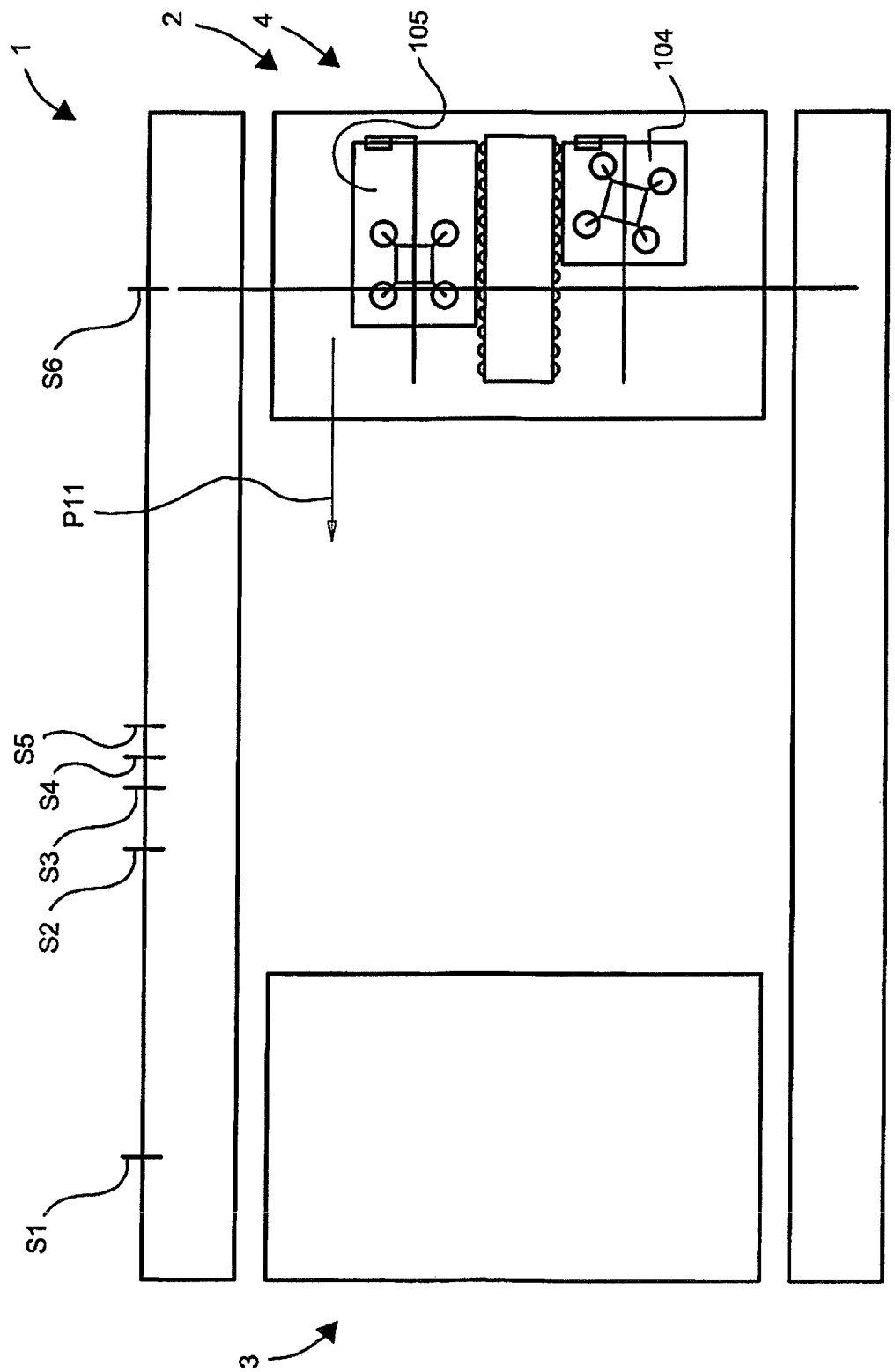

FIG. 7 shows in a sixth snapshot how the manipulator 2 with the plates 104, 105 has now arrived at the processing station 4 and has deposited the plates 104, 105 there. With an arrow P11, it is indicated that the manipulator 2 in a next step moves back again in the direction of the provision station 3 in order to handle other plates.

Figure 8:
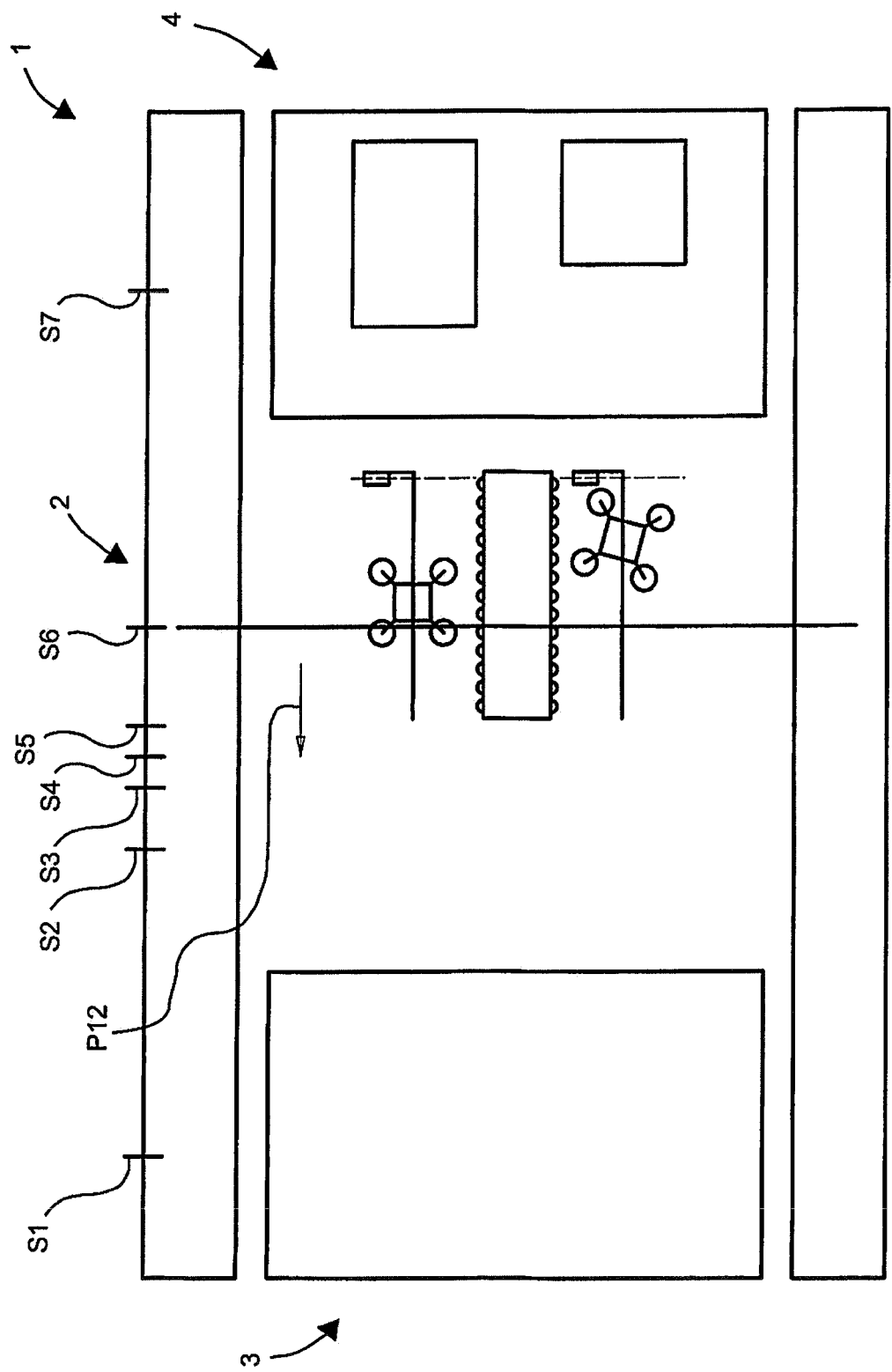

FIG. 8 shows in a seventh snapshot how the manipulator 2 is located on its return path in a position S7 and the deposited plates 104, 105 are still located in the processing station 4. With an arrow P12, it is indicated that the manipulator 2 moves back further in the direction of the provision station 3.

FIG. 9 shows in an eighth snapshot how the manipulator 2 has moved further in the direction of the provision station 3, wherein the plates 104, 105 have in the meantime been pushed together in the processing station 4 and welded to form the above-mentioned tailor-made metal sheet 106 and transported away by a non-illustrated manipulator.

FIG. 9 additionally shows a construction variant in which the production installation 1 comprises as an alternative to the sensors 17 and 18 which move with the manipulator 2 fixed sensors 217 and 218. These sensors 217, 218 are constructed as measuring sensors and are arranged in a carrier unit 251. The carrier unit 251 is positioned below a displacement plane VE in which the manipulator 2 displaces workpieces or plates. By the sensor 217 detecting a guiding edge of a first plate, for example, having a coordinate a and the sensor 218 detecting a guiding edge of a second plate, for example, having a coordinate b, on the basis of the coordinates a, b of a control device of the production installation 1 which is not illustrated an offset V between the mentioned guiding edges of the plates is established. On the basis of these offsets V, either a control instruction for an x drive of the first gripper 13 or a control instruction for an x drive of the second gripper 14 or for an x drive of the first gripper 13 and an x drive of the second gripper 14 is calculated and transmitted to the x drive(s) so that the position which the two plates assume with respect to each other changes in such a manner in the direction of the x axis or the orientation of longitudinal edges of the plates which are intended to be joined that they are kept offset-free by the manipulator 2. This means that the guiding edges of the two plates after elimination of the offset V are located in a straight line.

According to a construction variant, in the method sequence there is provision for the result of a correction carried out by at least one of the x drives to be controlled by the sensors 217, 218 or additional sensors and where applicable for a further correction, elimination of an offset, to be carried out.

In principle, it should be noted with regard to the description of the drawings that the snapshots or positions illustrated and described do not necessarily imply that the manipulator and/or the longitudinal cross-members and/or the grippers are in the idle state. The method instead makes provision for the manipulator and/or the longitudinal cross-members and/or the grippers on the way from the provision station into the processing station to move gently and in a jerk-free manner. It is thereby possible for the cycle time to be kept short and disruptive acceleration forces can thereby be prevented.

FIGS. 3 and 4 show that the first stop 10 and the second stop 11 are produced by a roller block 19, in which a large number of rollers which are arranged beside each other form a notional stop edge 10a or 11a. It is thereby possible for the plates 104 or 105 to float toward it since as a result of the rollers a tilting of the longitudinal edge 104a of the plate 104 or the longitudinal edge 105a of the plate 105 is effectively prevented.

The sensors 17, 18 and the additional sensors mentioned are preferably constructed as measuring sensors, so-called line sensors, by which the guiding edge of the plates is detected. Alternatively or additionally, there is also provision for reference points and/or the following edge or the rear edge of the plates to be detected. In order to have to carry out the fewest possible adjustment operations, there is also provision to arrange one or more sensors in order to detect an offset and then accordingly to take corrective action when the plates are transferred into the processing station.

Depending on the geometry of the workpieces or plates, there is provision for the grippers to also be displaced relative to each other in order to minimize displacement times, wherein the relative displacement can be carried out by only one of the two grippers being displaced or the grippers being displaced at different speeds and/or in different directions.

As a result of the method described, with a corresponding configuration of the components, it is possible for the plates of the tailor-made metal sheet to have an edge offset of +/−<0.3 mm.

In the method sequence, there is also provision in order to maintain a position of the workpiece(s) for the degrees of freedom of the manipulator to be at least partially blocked. In particular, there is provision for at least one of the longitudinal cross-members 8, 9 to be locked on the portal carrier and/or for at least one of the grippers to be locked on the associated longitudinal cross-member in each case with respect to a movement in the direction of the x axis and/or with respect to a lifting movement in the direction of the vertical axis or Z axis thereof.

As a result of the manipulator, there is a defined depositing of the plates in the processing station or a defined transfer to the processing operation so that in the processing station it is possible to dispense with an additional active orientation of the plates.

Figure 10:
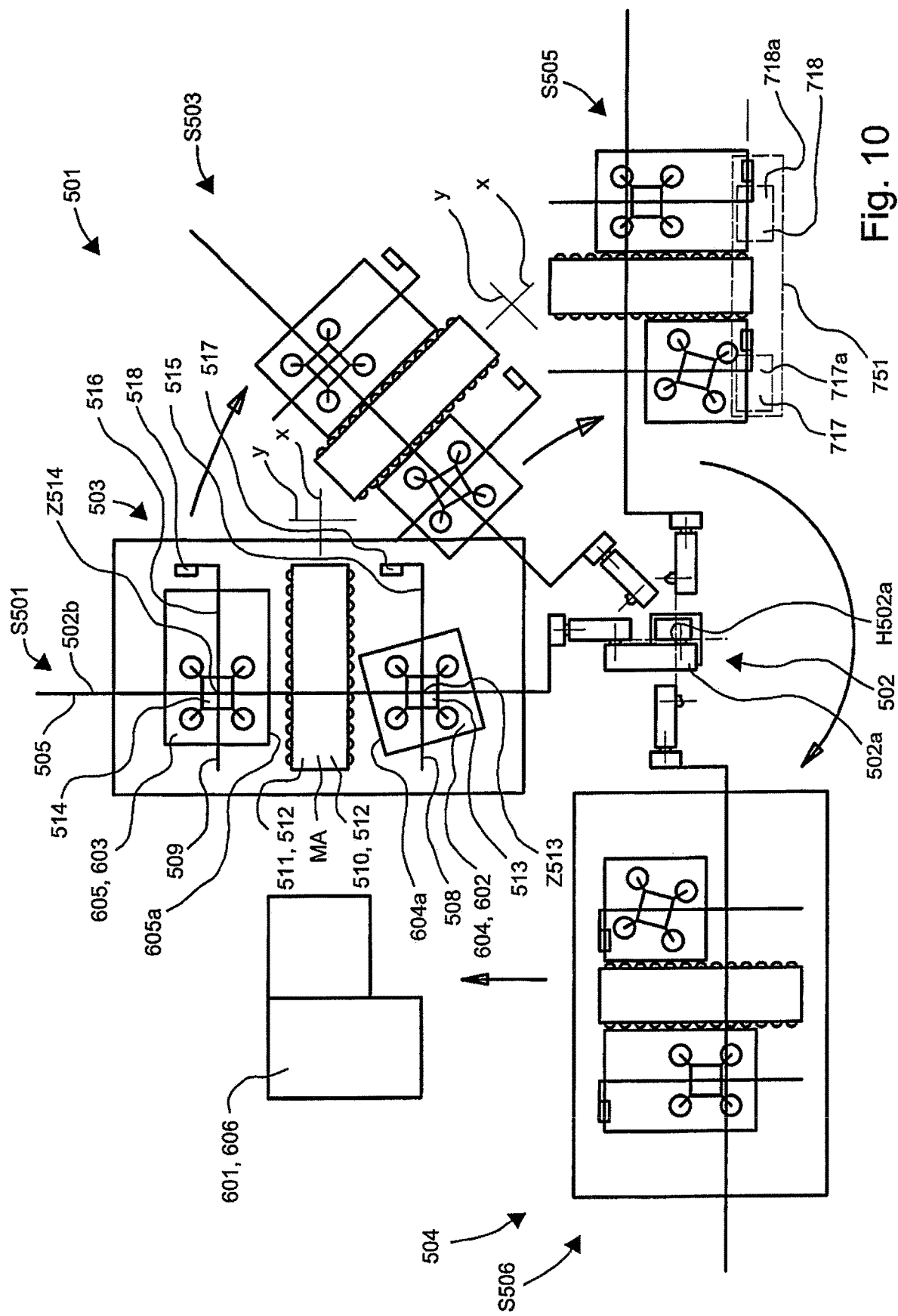
FIG. 10 is a schematic view of a portion of another construction variant of a production installation for producing tailor-made components from two workpieces, wherein the production installation comprises a manipulator, a provision station and a processing station.

FIG. 10 is a schematic plan view of a portion of another construction variant of a production installation 501 for producing tailor-made components 601 from planar workpieces 602, 603, wherein the workpieces 602, 603 are constructed as plates 604, 605 and are welded to form a tailor-made metal sheet 606. The production installation 501 comprises a manipulator 502, a provision station 503 and a processing station 504.

The manipulator 502 is used in principle to transport the workpieces 602, 603 from the provision station 503 into the processing station 504. The manipulator 502 comprises a multi-axis robot 502a and a handling device 502b, which is coupled to the multi-axis robot 502a and is moved thereby in space. The handling device 502b comprises a portal carrier 505. The handling device 502b is pivoted by the multi-axis robot 502a from a position S501 orientated toward the provision station 503 through 270° in a clockwise direction as far as a position S506 orientated toward the processing station 504 about a vertical axis H502a of the multi-axis robot 502a located perpendicularly to the drawing plane. In order to move the handling device 502b from the position S506 into the position S501 again, the multi-axis robot 502a either pivots the handling device 502b further through 90° in the clockwise direction or moves it through 270° back in a counter-clockwise direction. In FIG. 10, the manipulator 502 is shown in four different positions S501, S503, S505 and S506, wherein the multi-axis robot 502a is fully illustrated only in the position S501. In the remaining positions, the multi-axis robot 502a in order to maintain clarity is only depicted as a cut-out. The multi-axis robot 502a may also change the horizontal position which the handling device 502b assumes in space in FIG. 10 in order to move it, for example, past other components of the production installation 501 which are not illustrated. Furthermore, the multi-axis robot 502a may also deposit the handling device 502b in a changing station which is not illustrated and may grip another handling device which is suitable for handling other workpieces. The handling device 502b comprises mechanical stop mechanisms MA which are arranged on the portal carrier 505 between two longitudinal cross-members 508, 509. The mechanical stop mechanisms MA comprise a first stop 510 and a second stop 511, wherein the stops 510, 511 are constructed as transverse stops 512. With regard to the construction of the mechanical stop mechanisms MA, reference is also made to the description relating to FIGS. 1 to 9 since the stop mechanisms described therein are constructed in a structurally identical manner. The longitudinal cross-members 508, 509 can be displaced along a y axis on the portal carrier 505 and carry grippers 513, 514 which can be displaced along an x axis on the longitudinal cross-members 508, 509 and can be rotated or pivoted in each case about z axes Z513 or Z514 or vertical axes which are orientated perpendicularly to the drawing plane and orthogonally with respect to the x axis and the y axis with respect to the associated longitudinal cross-member 508, 509 and can preferably be lowered and raised in the direction of the associated z axes Z513 or Z514. A sensor 517, 518 is suspended on the longitudinal cross-members 508, 509 in each case in the direction toward the processing station 504 on a retention arm 515, 516.

According to a construction variant which is illustrated with broken lines in FIG. 10, there is provision for the sensor(s) mentioned not to be arranged on the manipulator but instead to be arranged in a state fixed in the production installation so that the manipulator moves the first plate and/or the second plate during the transport from the provision station to the processing station through a monitoring region 717a or 718a of a sensor 717 or 718. In this instance, the sensors 717, 718 are arranged on a carrier unit 751, which is installed in a fixed manner in the production installation 501.

In a similar manner to the first construction variant shown in FIGS. 1 to 9, the two plates 604 and 605 are approached in a floating manner toward the first stop 510 and the second stop 511 whilst the multi-axis robot 502a pivots the handling device 502b from the position S501 into the position S503. To this end, the longitudinal cross-members 508 and 509 are each displaced in the direction of the mechanical stop mechanisms MA, wherein the grippers 513, 514 which can be rotated about the vertical axes Z513 and Z514 thereof in this instance enable a pivoting of the plates 604, 605 so that they can move into abutment by the longitudinal edges 604*a* and 605*a* which are intended to be joined with the stop mechanism MA, as shown in the position S503.

On the path of the handling device 502*b* from the position S503 into the position S505, the plates 604 and 605 are displaced along the longitudinal cross-members 508, 509 in the direction of the sensors 517, 518, wherein the plates 604 and 605 are displaced with the measuring sensors 517, 518 in such a manner that the guiding edges 504*b* and 505*b* of the plates 504, 505 are located in a line and are consequently orientated toward each other without any offset.

If the production installation 501 is not operated with the sensors 517 and 518, but instead with the sensors 717 and 718, the handling device 502*b* is moved by the multi-axis robot 502*a* firstly into the position S505. In this position S505, the plates 604, 605 are then displaced via the sensors 717 and 718 independently of each other in such a manner that the guiding edges 504*b* and 505*b* thereof after the displacement are orientated in a line without any offset with respect to each other.

From the position S505, the handling device 502*b* is then pivoted by the multi-axis robot 502*a* into the position S506 via the processing station 504. There, the plates 504, 505 are deposited, pushed together and welded at the longitudinal edges 504*a* and 505*a* thereof to form the tailor-made metal sheet 606, which—as shown in FIG. 10—is then discharged from the processing station 504.

There is also provision for the manipulator shown in FIGS. 1 to 9 to be formed by a multi-axis robot and a handling device.

LIST OF REFERENCE NUMERALS

1 Production installation
2 Manipulator
3 Provision station
4 Processing station
5 Portal carrier
6, 7 Rail
8, 9 Longitudinal cross-member
10 First stop or first transverse stop
10*a* Notional stop edge
11 Second stop or second transverse stop
11*a* Notional stop edge
12 Transverse stop
13, 14 Gripper
15, 16 Retention arm for 17, 18
17 Sensor
17*a* Monitoring region of 17
17*b* Defined position in 17*a*
18 Sensor
18*a* Monitoring region of 18
18*b* Defined position in 18*a*
19 Roller block
101 Tailor-made component
102, 103 Workpiece
104 Plate
104*a* Longitudinal edge or workpiece edge to be joined
104*b* Guiding edge
105 Plate
105*a* Longitudinal edge or workpiece edge to be joined
105*b* Guiding edge
106 Tailor-made metal sheet
217 Sensor
218 Sensor
251 Carrier unit for 217, 218
501 Production installation
502 Manipulator
502*a* Multi-axis robot
502*b* Handling device
503 Provision station
504 Processing station
505 Portal carrier
506, 507 Rail
508, 509 Longitudinal cross-member
510 First stop or first transverse stop
511 Second stop or second transverse stop
512 Transverse stop
513, 514 Gripper
515, 516 Retention arm for 17, 18
517 Sensor
517*a* Monitoring region of 17
518 Sensor
518*a* Monitoring region of 18
518*b* Defined position in 18*a*
601 Tailor-made component
602, 603 Workpiece
604 Plate
604*a* Longitudinal edge or workpiece edge to be joined
604*b* Guiding edge
605 Plate
605*a* Longitudinal edge or workpiece edge to be joined
605*b* Guiding edge
606 Tailor-made metal sheet
717 Sensor
717*a* Monitoring region of 17
718 Sensor
718*a* Monitoring region of 18
751 Carrier unit
a Coordinate of the guiding edge of the 1st plate
b Coordinate of the guiding edge of the 2nd plate
H502*a* Vertical axis of 502*a*
MA Mechanical stop mechanism
V Offset of a and b
VE Displacement plane for 102, 103 and 104, 105
Z13 z axis of 13 and vertical axis of 13
Z513 z axis of 513 and vertical axis of 513
Z14 z axis of 14 and vertical axis of 14
Z514 z axis of 514 and vertical axis of 514

The invention claimed is:
1. A method for orientating two workpieces in order to form a joining connection, the method comprising the steps of:
introducing or retaining at least two workpieces in a provision station,
gripping the first workpiece with a first gripper, and gripping the second workpiece with a second gripper, removing the workpieces from the provision station and transporting the workpieces to a processing station,
wherein in a longitudinal orientation step, the first workpiece is orientated relative to the second workpiece along at least one of the workpiece edges by a linear movement of at least one of the first and second grippers relative to the other gripper,
wherein the longitudinal orientation step is carried out during the transport of the workpieces from the provision station to the processing station, and
wherein the first gripper and the second gripper are arranged on a common manipulator, and are moved in space by the common manipulator together from the provision station to the processing station, wherein, prior to the longitudinal orientation step, in a transverse orientation step, a first movement of the first gripper is carried out in a direction of the second gripper, and/or a first movement of the second gripper is carried out in a direction of the first gripper, wherein the first and second movements of the first and second grippers can be carried out simultaneously or successively, and wherein the transverse orientation step is carried out during the transport of the workpieces from the provision station to the processing station.

2. The method as claimed in claim 1, wherein during the transverse orientation step, the first workpiece is approached with the first movement against a first stop, and uses the first stop as a first reference position, and wherein the second workpiece is approached with the first movement against a second stop, and uses the second stop as a first reference position.

3. The method as claimed in claim 1, wherein after the transverse orientation step, in the longitudinal orientation step, a second movement of the first gripper, in a direction that differs from the first movement and which is non-parallel with respect to the first movement of the first gripper, is carried out, and/or a second movement of the second gripper, in a direction that differs from the first movement and which is non-parallel with respect to the first movement of the second gripper, is carried out, and wherein, in the event of movement of both the first and second grippers, the second movements are carried out simultaneously.

4. The method as claimed in claim 3, wherein during the longitudinal orientation step, during the second movement of the first workpiece, the first workpiece is moved against a third stop, and uses the third stop as a reference position, and during the second movement of the second workpiece, the second workpiece is moved against a fourth stop, and uses the fourth stop as a reference position.

5. The method as claimed in claim 1, wherein, at the beginning of the longitudinal orientation step, prior to the second movement of the first workpiece and/or prior to the second movement of the second workpiece, at least one measurement operation is performed, wherein, in the measurement operation, a first reference position on the first workpiece and a second reference position on the second workpiece are detected by at least one sensor, and wherein a relative spacing in at least one spatial direction between the first reference position and the second reference position is established and stored.

6. The method as claimed in claim 5, wherein, in order to end the longitudinal orientation step, at least one movement of one of the first and second grippers for orientating one of the workpieces with respect to a contactless reference mechanism is carried out.

7. The method as claimed in claim 6, wherein the contactless reference mechanism is a sensor or a virtual stop.

8. The method as claimed in claim 5, wherein the first reference position on the first workpiece and the second reference position on the second workpiece are detected by one sensor each.

9. The method as claimed in claim 1, wherein after the longitudinal orientation step, an offset position of the workpieces as a whole is measured, and the grippers are displaced during the transfer around the offset position, and wherein the displacement around the offset position is superimposed by a transport movement, or is carried out in a transport movement pause representing an idle state.

10. The method as claimed in claim 1, wherein when the workpieces are deposited in the processing station, the common manipulator corrects a previously measured or calculated offset in an x-axis direction of the common manipulator.

11. The method as claimed in claim 1, wherein after the longitudinal orientation step in the processing station, the workpieces are welded to each other by a laser welding method.

12. The method as claimed in claim 1, wherein the workpieces are constructed as planar plates.

13. The method as claimed in claim 12, wherein the planar plates of the workpieces comprise sheet metal plates.

14. The method as claimed in claim 13, wherein the sheet metal plates have different thicknesses and/or comprise different materials.

15. The method as claimed in claim 1, wherein the common manipulator is a multi-axis robot.

16. A manipulator comprising:

a first gripper;

a second gripper; and a mechanical stop mechanism comprising a roller block, wherein the roller block of the mechanical stop mechanism is arranged between the first and second grippers, wherein the mechanical stop mechanism defines a first stop edge in a direction toward the first gripper, wherein the roller block of the mechanical stop mechanism comprises at least three rollers arranged in the direction toward the first gripper, and running faces of the at least three rollers define the first stop edge, wherein the mechanical stop mechanism defines a second stop edge in a direction toward the second gripper, wherein the roller block of the mechanical stop mechanism comprises at least three additional rollers arranged in the direction toward the second gripper, and running faces of the at least three additional rollers define the second stop edge, wherein the first and second stop edges are orientated parallel with respect to each other, wherein the first and second grippers can each be displaced parallel with respect to the first and second stop edges longitudinally in an x-axis direction, wherein the first and second grippers can each be displaced transversely relative to the first and second stop edges in a transversely extending y-axis direction, and wherein the first and second grippers can be rotated about a vertical axis, which is perpendicular to the x-axis direction and the y-axis direction.

17. The manipulator as claimed in claim 16, wherein the first and second grippers are pneumatically driven in the transversely extending y-axis direction, and/or wherein at least one of the first and second grippers is driven in the longitudinally extending x-axis direction by a servo motor.

18. The manipulator as claimed in claim 16, wherein, on the manipulator, at least one measuring sensor is associated with each gripper, wherein the at least one measuring sensor is constructed as a surface sensor that monitors a surface, and/or wherein at least one of the at least one measuring sensor is fixed to the manipulator and can be displaced with the manipulator, and/or wherein at least one of the at least one measuring sensor is a non-displaceable component of a production installation, and/or wherein the roller block of the mechanical stop mechanism is divided into a first portion and a second portion at each stop edge in the longitudinal x-axis direction, and wherein the first portion and the second portion are each galvanically separated from each other so that an electrically conductive workpiece that abuts both the first and second portions can be electrically detected.

19. The manipulator as claimed in claim 16, wherein the manipulator comprises a portal carrier that is flange-mounted on the manipulator and arranged between the manipulator and the first and second grippers, and wherein the roller block is also flange-mounted on the manipulator such that the manipulator moves the first and second grippers and the roller block together such so that the first gripper moves the first workpiece and the second gripper moves the second workpiece independently of each other relative to the portal carrier and to the roller block, which is fixed to the portal carrier.

20. A method for orientating two workpieces in order to form a joining connection, the method comprising the steps of:

introducing or retaining at least two workpieces in a provision station, gripping the first workpiece with a first gripper, and gripping the second workpiece with a second gripper, removing the workpieces from the provision station and transporting the workpieces to a processing station, wherein in a longitudinal orientation step, the first workpiece is orientated relative to the second workpiece along at least one of the workpiece edges by a linear movement of at least one of the first and second grippers relative to the other gripper, wherein the longitudinal orientation step is carried out during the transport of the workpieces from the provision station to the processing station, wherein the first gripper and the second gripper are arranged on a common manipulator, and are moved in space by the common manipulator together from the provision station to the processing station, wherein prior to the longitudinal orientation step, in a transverse orientation step, a first movement of the first gripper is carried out in a direction of the second gripper, and/or a first movement of the second gripper is carried out in a direction of the first gripper, wherein the first and second movements of the first and second grippers can be carried out simultaneously or successively, wherein the transverse orientation step is carried out during the transport of the workpieces from the provision station to the processing station, wherein during the transverse orientation step, the first workpiece is approached with the first movement against a first stop, and uses the first stop as a first reference position, and wherein the second workpiece is approached with the first movement against a second stop, and uses the second stop as a first reference position.

21. A method for orientating two workpieces in order to form a joining connection, the method comprising the steps of:

introducing or retaining at least two workpieces in a provision station, gripping the first workpiece with a first gripper, and gripping the second workpiece with a second gripper, removing the workpieces from the provision station and transporting the workpieces to a processing station, wherein in a longitudinal orientation step, the first workpiece is orientated relative to the second workpiece along at least one of the workpiece edges by a linear movement of at least one of the first and second grippers relative to the other gripper, wherein the longitudinal orientation step is carried out during the transport of the workpieces from the provision station to the processing station, wherein the first gripper and the second gripper are arranged on a common manipulator, and are moved in space by the common manipulator together from the provision station to the processing station, wherein after the transverse orientation step, in the longitudinal orientation step, a second movement of the first gripper, in a direction that differs from the first movement and which is non-parallel with respect to the first movement of the first gripper, is carried out, and/or a second movement of the second gripper, in a direction that differs from the first movement and which is non-parallel with respect to the first movement of the second gripper, is carried out, and wherein, in the event of movement of both the first and second grippers, the second movements are carried out simultaneously.

22. A method for orientating two workpieces in order to form a joining connection, the method comprising the steps of:

introducing or retaining at least two workpieces in a provision station, gripping the first workpiece with a first gripper, and gripping the second workpiece with a second gripper, removing the workpieces from the provision station and transporting the workpieces to a processing station, wherein in a longitudinal orientation step, the first workpiece is orientated relative to the second workpiece along at least one of the workpiece edges by a linear movement of at least one of the first and second grippers relative to the other gripper, wherein the longitudinal orientation step is carried out during the transport of the workpieces from the provision station to the processing station, wherein the first gripper and the second gripper are arranged on a common manipulator, and are moved in space by the common manipulator together from the provision station to the processing station, wherein after the transverse orientation step, in the longitudinal orientation step, a second movement of the first gripper, in a direction that differs from the first movement and which is non-parallel with respect to the first movement of the first gripper, is carried out, and/or a second movement of the second gripper, in a direction that differs from the first movement and which is non-parallel with respect to the first movement of the second gripper, is carried out, wherein, in the event of movement of both the first and second grippers, the second movements are carried out simultaneously, and wherein during the longitudinal orientation step, during the second movement of the first workpiece, the first workpiece is moved against a third stop, and uses the third stop as a reference position, and during the second movement of the second workpiece, the second workpiece is moved against a fourth stop, and uses the fourth stop as a reference position.

23. A method for orientating two workpieces in order to form a joining connection, the method comprising the steps of:
- introducing or retaining at least two workpieces in a provision station,
- gripping the first workpiece with a first gripper, and
- gripping the second workpiece with a second gripper, removing the workpieces from the provision station and transporting the workpieces to a processing station,
- wherein in a longitudinal orientation step, the first workpiece is orientated relative to the second workpiece along at least one of the workpiece edges by a linear movement of at least one of the first and second grippers relative to the other gripper,
- wherein the longitudinal orientation step is carried out during the transport of the workpieces from the provision station to the processing station,
- wherein the first gripper and the second gripper are arranged on a common manipulator, and are moved in space by the common manipulator together from the provision station to the processing station, and
- wherein when the workpieces are deposited in the processing station, the common manipulator corrects a previously measured or calculated offset in an x-axis direction of the common manipulator.

* * * * *